United States Patent [19]

Carpenter

[11] Patent Number: 5,284,405
[45] Date of Patent: Feb. 8, 1994

[54] METHOD AND APPARATUS FOR INJECTING SLUDGE INTO A KILN

[75] Inventor: Keith H. Carpenter, Centerville, Ohio

[73] Assignee: Systech Environmental Corporation, Xenia, Ohio

[21] Appl. No.: 814,358

[22] Filed: Dec. 27, 1991

Related U.S. Application Data

[63] Continuation-in-part of Ser. No. 554,053, Jul. 13, 1990, Pat. No. 5,076,179.

[51] Int. Cl.⁵ .................................................. B65G 53/52
[52] U.S. Cl. ........................................ 406/194; 406/92; 406/95; 241/39; 110/238; 110/264; 110/347; 239/424.5; 239/117; 239/417.3; 239/405
[58] Field of Search ............... 406/194, 92, 88, 95, 406/153, 154, 191, 195; 241/5, 39; 110/238, 264, 347, 346; 137/896; 239/424.5, 427.3, 427, 416.5, 117, 417.3, 407, 417, 402, 402.5, 405

[56] References Cited

U.S. PATENT DOCUMENTS

| | | | |
|---|---|---|---|
| 859,926 | 7/1907 | Dieckmann et al. | 239/417 |
| 998,762 | 7/1911 | Faller | 406/92 X |
| 1,481,419 | 1/1924 | Davies | 239/417 |
| 1,981,248 | 11/1934 | Purcell | 239/416.5 |
| 2,965,312 | 12/1960 | Hale | 239/416.5 |
| 3,442,498 | 5/1969 | Davis . | |
| 3,523,775 | 8/1970 | Rueckl . | |
| 4,022,629 | 5/1977 | Garrett et al. . | |
| 4,022,630 | 5/1977 | Watson et al. . | |
| 4,081,285 | 3/1978 | Pennell . | |
| 4,407,236 | 10/1983 | Schukei et al. . | |
| 4,517,905 | 5/1985 | Chastain et al. | 110/346 |
| 4,523,530 | 6/1985 | Kaminaka et al. | 110/264 |
| 4,850,290 | 7/1989 | Benoit et al. . | |
| 5,076,179 | 12/1991 | Carpenter | 110/264 |

FOREIGN PATENT DOCUMENTS

| | | | |
|---|---|---|---|
| 374844 | 10/1920 | Fed. Rep. of Germany | 239/402.5 |
| 2733131 | 2/1979 | Fed. Rep. of Germany | 110/238 |
| 3514931 | 10/1986 | Fed. Rep. of Germany | 239/427.3 |
| 8701868 | 7/1987 | PCT Int'l Appl. . | |
| 753742 | 8/1980 | U.S.S.R. | 406/88 |
| 1207946 | 1/1986 | U.S.S.R. | 406/191 |
| 475721 | 11/1937 | United Kingdom | 239/427.3 |
| 805902 | 12/1958 | United Kingdom | 239/427.3 |

Primary Examiner—David M. Mitchell
Assistant Examiner—Gary C. Hoge
Attorney, Agent, or Firm—Thompson, Hine and Flory

[57] ABSTRACT

A method and apparatus for injecting sludge into a kiln includes a pump for pumping sludge, a conduit for conveying sludge to the kiln including an attrition portion for attriting the sludge into smaller particles, and a conduit enclosing the attrition segment for entraining the particles in a stream of combustion air to carry the particles into a kiln. The attrition portion includes a plurality of passageways connected to a source of compressed air to provide a plurality of jets of air to attrite the sludge into discrete particles and aid in ejecting the sludge from the conduit. In a preferred embodiment, the attrition segment includes nested, frusto-conical segments; each having a plurality of passageways which project jets of compressed air radially inwardly to slice the sludge mass within the segment into smaller particles. As the particles exit the attrition segment, they enter an extension tube having a helical internal rib which imparts a swirling motion to the particles. The particles then become entrained in combustion air flowing from an air conduit enclosing the attrition segment and are carried into the kiln in a shaped cloud.

21 Claims, 3 Drawing Sheets

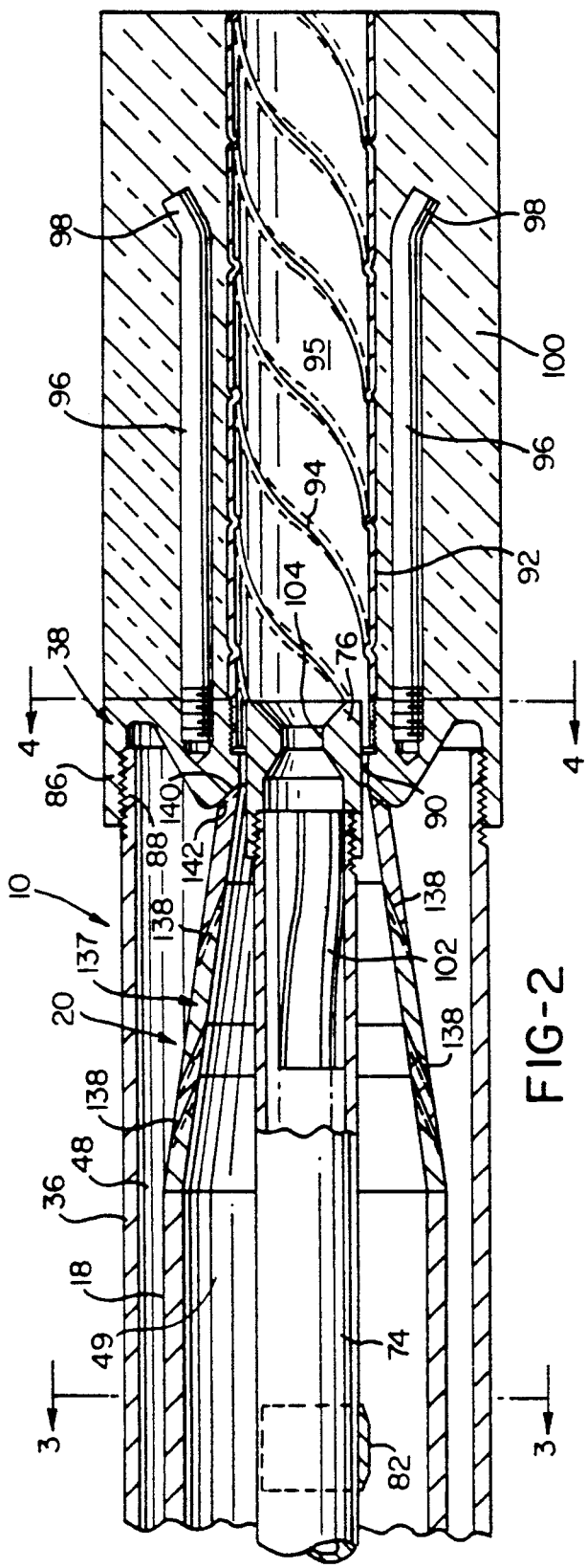
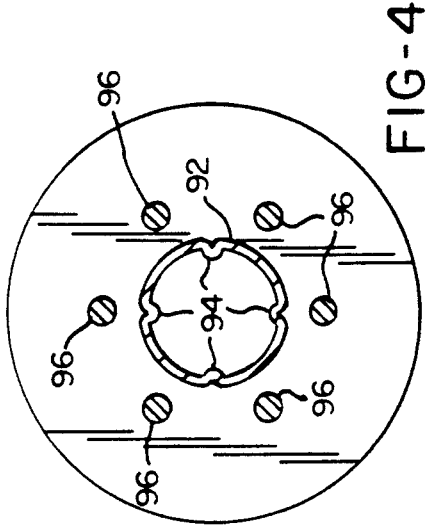
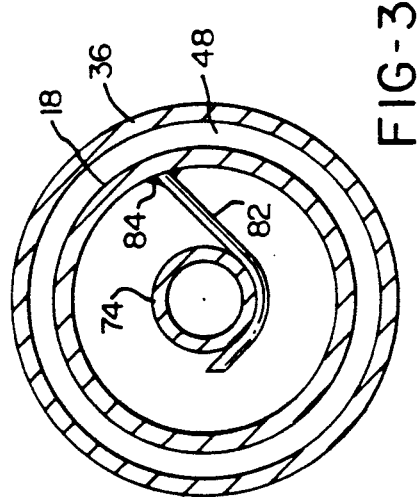

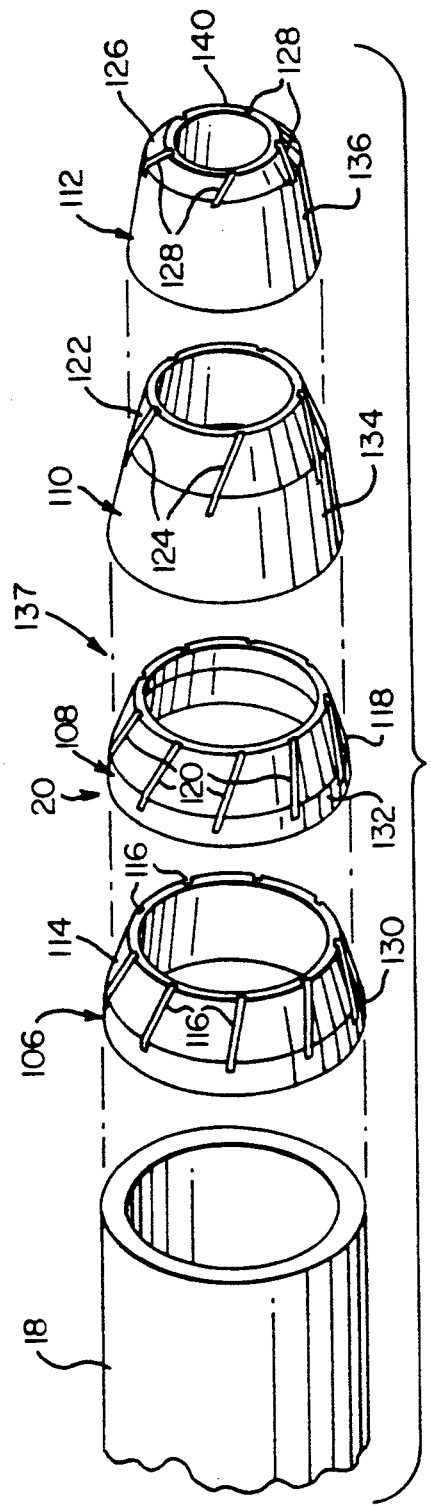
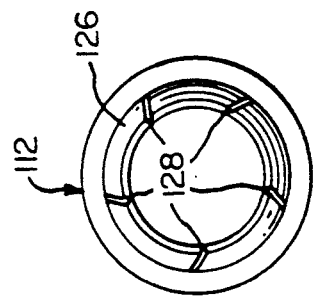
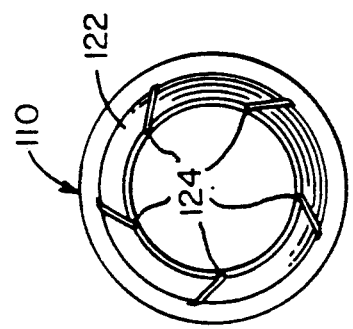
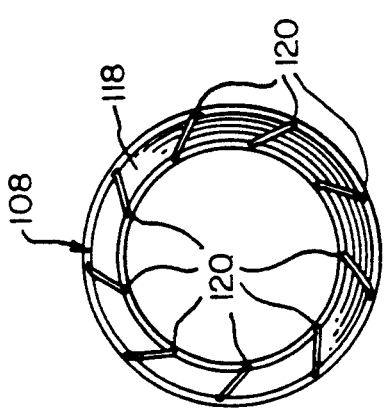
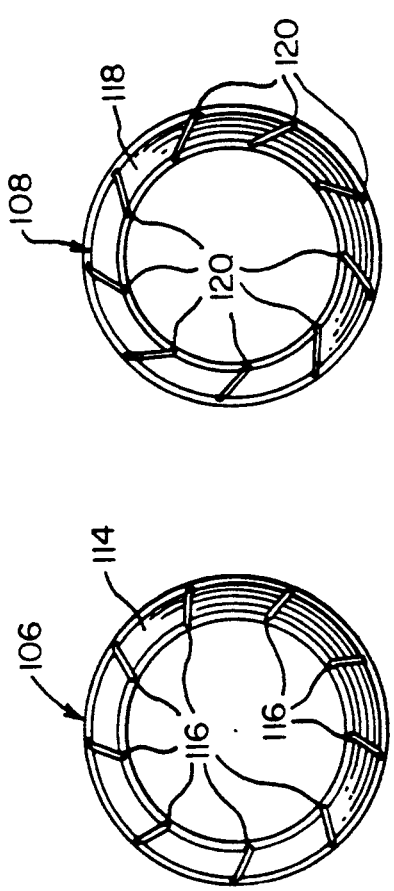

METHOD AND APPARATUS FOR INJECTING SLUDGE INTO A KILN

CROSS REFERENCE TO RELATED APPLICATION

This application is a continuation-in-part of U.S. Ser. No. 554,053 filed Jul. 13, 1990, now U.S. Pat. No. 5,076,179.

BACKGROUND OF THE INVENTION

The present invention relates to apparatus for feeding fuel to a kiln and, more particularly, to a method and apparatus for feeding sludge into a rotary cement kiln.

In response to increasing concern over the disposal of waste material in a manner which does not generate pollution, attempts have been made to burn waste material as a part of a rotary kiln cement-making process. Use of refuse-derived fuel ("RDF"), having a volatile organic content, is desirable in a cement-making process in that the waste is incinerated at relatively elevated temperatures, such as 1,300°-1,600° C., which is sufficient to break down the toxic or hazardous constituents of the waste. Further, the combustion of waste adds heat to the cement-making process and the ash becomes part of the cement clinker.

Since industries and municipalities are willing to pay for the disposal of such waste, the overall cost of cement making is reduced by the income received from accepting waste and from the reduced dependence upon conventional fossil fuels in the cement-making process.

An example of such a process is disclosed in Watson, et al. U.S. Pat. No. 4,022,630. That patent discloses a method of incinerating municipal refuse by burning it in a pulverized condition in a rotary cement kiln by blowing the refuse, in a comminuted state, into a kiln at the same location as the conventional fuel burners. The device requires that the comminuted refuse have a heating value sufficient to enable it to be burned while entrained in an air stream in a manner similar to the burning of conventional fuel.

In order to utilize RDF and, at the same time, produce the highest quality cement clinker, it is necessary to burn the RDF as completely as possible. This requires that the RDF be comminuted into very small particles to increase the collective surface area of the RDF and promote mixing with oxygen. While this is relatively easy to accomplish with standard municipal refuse and liquid refuse, such as oil or cleaning solvents, it becomes difficult with more viscous material, such as sludge.

The Benoit, et al. U.S. Pat. No. 4,850,290 discloses an apparatus for burning sludge in a rotary kiln in which the sludge is injected into the kiln in the form of discrete fuel containers. The kiln body includes a radially-extending tube in which the sludge capsule is placed. As the tube passes the vertical, the sludge capsule is drawn by gravity downwardly into the kiln bed where it is burned. The sludge capsule itself comprises combustible material. A disadvantage with such a device is that the sludge is placed into the kiln in a large mass which does not promote burning of the sludge and also creates a relatively "cool" spot in the burning clinker. Such a cool spot may adversely affect the quality of the clinker produced by the kiln. Also, incomplete burning of the sludge may lead to the generation of carbon monoxide which subsequently is discharged to the atmosphere as an undesirable constituent.

Accordingly, there is a need for a device for burning highly viscous sludge in which the sludge is injected into a cement kiln in a fashion which promotes the rapid and complete burning of the sludge without affecting the quality of the cement clinker produced.

SUMMARY OF INVENTION

The present invention is a method and apparatus for injecting sludge into a kiln which tends to maintain the quality of the cement clinker produced in the kiln and promotes the complete burning of the sludge within the kiln. The apparatus includes an inner conduit communicating with a rotary kiln for conveying sludge to the kiln, a pump for propelling the sludge along the conduit and the conduit having an attrition portion adjacent to the kiln for attriting the sludge into relatively small, discrete particles. The attrition portion includes a plurality of passageways connected to a source of compressed air for injecting concentrated jets of compressed air into the volume within the portion.

Preferably, the compressed air is supplied through an outer conduit, concentric with the inner conduit. The attrition portion is enclosed in a larger conduit which conveys compressed air into the kiln so that the attrited sludge is entrained in the air. An extension tube projects from the attrition portion and includes an internal, helical thread to impart a swirl to the attrited sludge exiting the attrition portion.

In a preferred embodiment, the attrition portion includes a plurality of nested, frusto-conical segments, each having channels on an exterior surface which extend through the overlapped portion of the segment to form the passageways. The segments are held in the nested arrangement by an end cap, threaded on the outer conduit, which clamps the segments against the end of the conduit. A central tube in the inner conduit supplies compressed air to the center of the attrition portion, as needed, and is selectively positionable relative to the attrition portion.

In operation, sludge is pumped to the attrition portion where the jets of compressed air slice through the sludge like knives to break up the sludge into small particles. The force of the compressed air, combined with the pressure of the sludge flowing to the attrition portion, causes the sludge particles to move forwardly into the kiln. At this point, the sludge particles become entrained in the compressed air stream flowing into the kiln and are carried, airborne-fashion, into the kiln for combustion.

Accordingly, it is an object of the present invention to provide a method and apparatus for injecting highly viscous sludge into a cement kiln through the use of compressed air; a method and apparatus for breaking up large quantities of sludge into finely-divided particles to promote the rapid burning of the particles; a method and apparatus for injecting sludge into a cement kiln which maintains the quality of the cement clinker produced by the kiln; and a method and apparatus for injecting sludge into a kiln which has few moving parts, is relatively wear-resistant and is easy to disassemble for maintenance and repair.

Other objects and advantages of the present invention will be apparent from the following description, the accompanying drawings and the appended claims.

BRIEF DESCRIPTION OF THE DRAWING

FIG. 2 is a detail side elevation in section of the attrition portion of the apparatus of FIG. 1, in which the nozzle has been displaced into the attrition portion;

FIG. 3 is an end elevation in section taken at line 3—3 of FIG. 2;

FIG. 4 is an end elevation in section taken at line 4—4 of FIG. 2;

FIG. 5 is an exploded, perspective view of the attrition portion of the apparatus of FIG. 1;

FIG. 6 is an end elevation a base segment of the attrition portion shown in FIG. 5;

FIG. 7 is an end elevation of a first intermediate segment of the attrition portion of FIG. 5;

FIG. 8 is an end elevation of a second intermediate segment of the attrition portion of FIG. 5; and FIG. 9 is an end elevation of the end segment of the attrition portion of FIG. 5.

DETAILED DESCRIPTION

Figure 1:
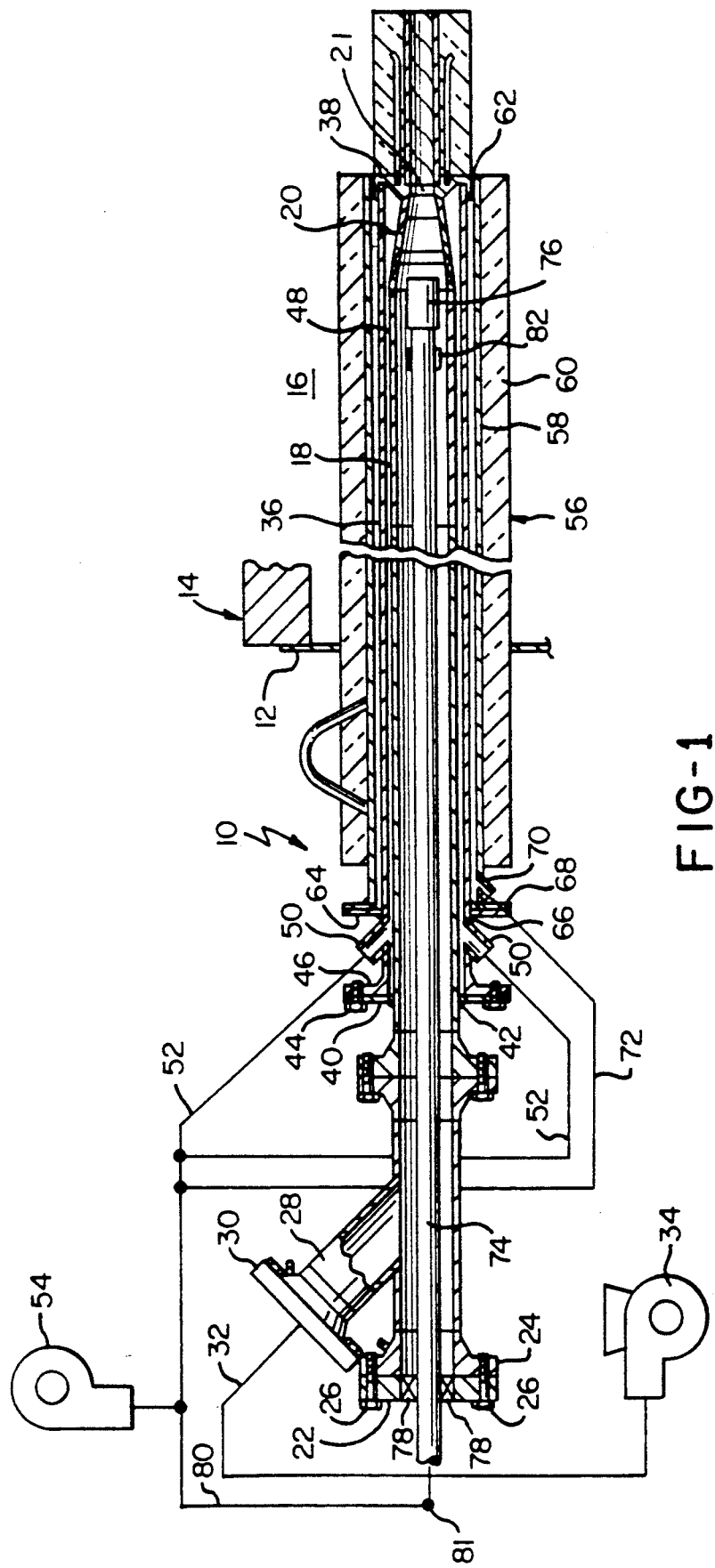
FIG. 1 is a schematic, side elevation in section of the sludge injection apparatus of the present invention.

As shown in FIG. 1, the sludge injection apparatus of the present invention, generally designated 10, protrudes through the end wall 12 of a rotary reactor such as a cement kiln 14 and extends into the interior area 16 where combustion occurs. The apparatus 10 includes an inner conduit 18 which terminates in an attrition portion 20 having an open inner end 21 within the interior 16, and is enclosed at an outer end by an end cap 22 secured to an end flange 24 by a ring of bolts 26.

The inner conduit 18 includes a branching conduit 28 which terminates in a flange 30 which is connected to a sludge supply conduit 32, shown schematically in FIG. 1. The sludge supply conduit 32 is connected to a sludge pump 34, preferably a piston pump.

The inner conduit 18 is enclosed by, and is concentric with, an outer conduit 36 which is sealed by an end cap 38 at an inner end (see also FIG. 2) and by a cover plate 40 at an outer end. Cover plate 40 includes an orifice which receives the inner conduit 18 therethrough and is connected to the inner conduit by weldments 42. The cover plate 40 is connected by a ring of bolts 44 to an end flange 46 of the outer conduit. Consequently, the inner and outer conduits form a cylindrical inner air supply chamber 48 which extends along the exterior of the inner conduit 18.

The outer conduit 36 includes inlets 50 which are connected to air supply conduits 52 (shown schematically) which supply air from a source of compressed air, such as a compressor 54.

The outer conduit 36 is enclosed by a housing 56 which includes a cylindrical jacket 58 lined with an insulating refractory 60. The housing has an annular opening 62 within the kiln interior 16 and is sealed by an end plate 64 at an outer end, through which the outer conduit 36 extends. The connection is sealed by weldments 66 and the end plate 64 is welded to end flange 68. The jacket 58 includes inlets 70 which are connected to air supply conduits 72 that receive compressed air from supply conduit 52.

An inner air supply tube 74 is concentric with the inner conduit 18 and terminates in a nozzle 76 immediately adjacent to the attrition portion 20. The tube 74 extends through end packing 78 in end cap 22 and is supplied with compressed air from flexible conduit 80, which receives compressed air from compressor 54.

Tube 74 is longitudinally displaceable within conduit 18, so that nozzle 76 is selectively displaceable relative to attrition portion 20, and is activated by actuating a valve 81.

As shown in FIGS. 2 and 3, the tube 74 is supported at its inner end by a bracket 82 which is attached to the interior wall of the inner conduit 18 by weld 84, and includes an arcuate portion which cradles the tube. The outer tube end cap 38 includes a threaded annular wall 86 which screws onto corresponding threads 88 on the end of the outer conduit 36. The end cap 38 includes a central orifice 90 which is threaded and receives the outer end of an extension tube 92, so that the extension tube communicates with the inner conduit 18.

As shown in FIGS. 2 and 4, extension tube 92 includes a series of helical ribs 94 which project radially inwardly from an internal surface 95 toward a centerline of the tube. Six mounting bars 96 are threaded into the end cap 38 at their outer ends and include angled inner ends 98. As shown in FIG. 4, the bars 96 are spaced about the extension tube 92. The mounting bars 96 support an insulating shell 100 of refractory material which encases the extension tube 92 and is approximately equal in diameter to the end cap 38. The end cap 38 is assembled by first attaching the extension tube 92 and mounting bars 96 to the end cap, then casting the refractory shell 100 about the tube and bars.

The air supply tube 74 includes radially-inwardly projecting, helical ribs 102. The nozzle 76 includes a restricted orifice 104, which adds velocity to the air conveyed by the tube 74. The nozzle 76 is threaded on the end of the tube 74.

As shown in FIG. 5, the attrition portion 20 comprises four annular nested segments, which comprise a base segment 106 (see also FIG. 6), a first intermediate segment 108 (see also FIG. 7), a second intermediate segment 110 (see also FIG. 8) and an outer segment 112 (see also FIG. 9). Base segment 106 is attached to the end of the inner conduit 18 by weldments and includes a frusto-conical portion 114 having a series of longitudinally-extending, skewed slots 116 spaced about its periphery. First intermediate segment 108 includes a frusto-conical portion 118 having a plurality of longitudinally-extending, skewed slots 120 extending about its periphery. Second intermediate segment 110 includes frusto-conical portion 122 which includes a plurality of slots 124 spaced about its periphery; and end segment 112 includes frusto-conical portion 126 having a plurality of longitudinally-extending, skewed slots 128 spaced about its periphery.

Segments 106, 108, 110 and 112 also include the base portions 130, 132, 134 and 136, which are also frusto-conical in shape, but do not taper as severely as adjacent portions 114, 118, 122 and 126, respectively. The slots 116, 120, 124 and 128 project rearwardly from the inner portions of the segments 106, 108, 110 and 112 and extend slightly into the base portions 130, 132, 134 and 136. The base portions 130, 132, 134 and 136, and frusto-conical portions 114, 118, 122 and 126 are tapered such that, when nested, the segments 106, 108, 110 and 112 form a continuous, tapered body 137 having passages 138 (see FIG. 2), formed from slots 116, 120, 124 and 128 extending from the inner air supply chamber 48 to the interior 49 of the inner conduit 18.

The inner end 140 of the outer segment 112 is beveled and engages a correspondingly-beveled outer opening 142 of the end cap 38. This connection provides a centering feature such that the segments 106, 108, 110 and 112 remain concentric with a central axis of the apparatus 10. Further, the engagement between the outer segment 112 and end cap 38 clamps the segments 106, 108, 110 and 112 against the inner conduit 18, and the nested engagement between these segments prevents them from skewing relative to each other. Consequently, there is no need for a mechanical connection between the segments 106, 108, 110 and 112 such as bolts or welds. Further, the disassembly of the body 137 for cleaning or repair is facilitated.

The operation of the sludge injection apparatus is as follows. Sludge—which is primarily a viscous liquid, or a viscous liquid with relatively small particulates suspended in it—is deposited in the sludge pump 34 and is conveyed through the supply conduit 32 to the branch conduit 28, where it enters the interior of the inner conduit 18 and flows inwardly along the conduit to an area within the rotary kiln 14. Compressed air from compressor 54 is conveyed through conduits 52, 72, 80 to the inner air supply chamber 48 and to the annular space within jacket 58. Experiments have achieved successful results with air pressure as low as 75 psi (5.27 ksi), but best results are obtained at pressures of at least 90 psi (6.33 ksi). Further, compressed air is conveyed through air supply tube 74 along the center of the inner conduit 18.

As the sludge material enters the attrition portion, it is attrited by jets of compressed air which pass through the passages 138 formed by the segments 106, 108, 110 and 112 of the attrition portion. The jets of compressed air slice through the sludge, breaking it up into small particles, where it continues to progress through the orifice 90 in the end cap 38 and enters the extension tube. There, the sludge is accelerated by the jet of air exiting the nozzle 76 of the air supply tube and is swirled as a result of frictional engagement with the helical ribs 94 of the extension tube. Experiments have indicated that best results can be obtained with a rib height of at least 0.125 in (3.18 mm) and preferably 0.25 in (6.35 mm). Upon exiting the extension tube, the sludge particles form a swirling stream which is further confined by compressed air exiting the jacket 58, which envelopes the shell 100 of the extension tube 92 and helps maintain its temperature within the desired limits. Although not normally needed, if necessary, the tube 74 is activated and the nozzle 76 displaced to the attriter body 137 (FIG. 2) in order to attrite or dislodge large particles in the attriter body.

While the form of apparatus herein described constitutes a preferred embodiment of the invention, it is to be understood that the invention is not limited to this precise form of apparatus, and that changes may be made therein without departing from the scope of the invention.

What is claimed is:

1. An apparatus for injecting sludge into a kiln comprising:
   an outer conduit;
   an inner conduit having an open end, said inner conduit extending within said outer conduit and forming a cylindrical air manifold therewith;
   said inner conduit including an attrition portion having a plurality of nested segments positioned at said open end, each of said segments having a plurality of channels formed in an outer surface thereof, said channels extending between an overlapping portion of each of said segments, thereby an overlapping portion of each of said segments, thereby providing a passageway from said manifold to an interior volume of said inner conduit;
   means for supplying pressurized fluid to said manifold for forming jets of said fluid through said passageways; said jets penetrate and thereby attrite sludge from said inner conduit; and
   means for forcing sludge from along said inner conduit to said attrition portion.

2. The apparatus of claim 1 further comprising means for injecting a compressed fluid axially along said inner conduit; said compressed fluid attrites said sludge and propels said attrited sludge from said open end.

3. The apparatus of claim 2 wherein said injecting means includes a tube extending axially along said inner conduit and including a nozzle at the end of said tube, said tube being displaceable within said inner conduit whereby said nozzle is selectively positionable relative to said attrition portion.

4. The apparatus of claim 3 wherein said tube includes internal helical ribs shaped to impart a swirling motion to pressurized fluid flowing through said tube; and said nozzle includes an orifice shaped to increase velocity of fluid flowing through said nozzle.

5. The apparatus of claim 4 wherein said conduit includes means for supporting said tube.

6. An apparatus for injecting sludge into a kiln comprising:
   a conduit having an open end and an attrition portion including a plurality of overlapping segments positioned at said open end, each of said overlapping segments having a plurality of channels extending from an outer surface of said segment and into an inner volume of said conduit, said channels forming passages between said overlapping segments;
   means forming a manifold communicating with said channels;
   means for supplying pressurized fluid to said manifold; said pressurized fluid forming jet of fluid projecting from said passages into said inner volume; said jets penetrate sludge in said attrition portion and thereby attrite such sludge and propel said sludge from said attrition portion through said open end; and
   means for supplying said sludge along said conduit to said attrition portion.

7. An apparatus for injecting sludge into a kiln comprising:
   a conduit having an open end and an attrition portion including a plurality of overlapping frusto-conical segments positioned at said open end, each of said overlapping segments having a plurality of channels extending from an outer surface of said segment and into an inner volume of said conduit said channels forming passages between said overlapping segments;
   means forming a manifold communicating with said channels;
   means for supplying pressurized fluid to said manifold;
   said pressurized fluid forming jets of fluid projecting from said passages into said inner volume;
   said jets penetrate sludge in said attrition portion and thereby attrite such sludge and propel said sludge from said attrition portion through said open end; and
   means for supplying said sludge along said conduit to said attrition portion.

8. The apparatus of claim 7 wherein said segments, when arranged in said overlapping relation, form a frusto-conical body at an end of said conduit, a cross-sectional area of said body diminishing toward said open end.

9. The apparatus of claim 7 wherein said passages are spaced about a periphery of each of said segments.

10. The apparatus of claim 9 wherein said conduit includes an extension projecting from said open end, said extension having means for imparting a swirling motion to said discrete particles passing through said open end.

11. The apparatus of claim 10 wherein said extension is cylindrical in shape and includes helical ribs on an internal surface thereof.

12. The apparatus of claim 11 wherein said manifold includes an outer conduit, concentric with said conduit, said conduit and said outer conduit forming said manifold.

13. The apparatus of claim 12 wherein said manifold further comprises an end cap attached to said outer conduit, said end cap including an opening axially aligned with said open end.

14. The apparatus of claim 13 wherein said end cap includes bearing surface means for engaging an end of said frusto-conical body, said bearing surface means maintaining said segments in overlapping relation concentric with said conduit.

15. The apparatus of claim 14 wherein said end of said frusto-conical body includes a beveled rim, and said bearing surface means includes a complimentarily-beveled portion for engaging and centering said frusto-conical section.

16. The apparatus of claim 15 wherein said end cap includes means for threading said end cap onto said outer conduit for clamping said segments against each other and a remainder of said conduit.

17. The apparatus of claim 13 further comprising insulation means surrounding said extension.

18. The apparatus of claim 17 further comprising means for anchoring said insulation means to said end cap.

19. The apparatus of claim 18 wherein said anchoring means includes a plurality of rods attached to said end cap and extending through said insulation means.

20. An apparatus for injecting sludge into a kiln comprising:
 a conduit having an open end and an attrition portion located at said open end, said portion including a plurality of overlapping segments and a plurality of longitudinally-extending channels formed between overlapped portions of said segments, said channels forming a plurality of passageways therethrough angled toward said open end;
 a manifold communicating with said passageways;
 means for supplying sludge to said conduit whereby said sludge flows through said conduit and out said open end;
 means for supplying a fluid to said manifold under pressure; said pressurized fluid forming jets of fluid through said passageways into an interior of said attrition portion, whereby said jets penetrate and attrite said sludge in said portion.

21. The apparatus of claim 20 wherein said fluid is air.

* * * * *